July 3, 1923.   1,460,742

F. E. ABBOTT

SPLICE BAR FOR RAIL JOINTS

Filed Nov. 26, 1920

Inventor
Franklin E. Abbott
By his Attorney

Patented July 3, 1923.

1,460,742

UNITED STATES PATENT OFFICE.

FRANKLIN E. ABBOTT, OF BUFFALO, NEW YORK, ASSIGNOR, BY MESNE ASSIGNMENTS, TO BETHLEHEM STEEL COMPANY OF NEW YORK, INC., A CORPORATION OF NEW YORK.

SPLICE BAR FOR RAIL JOINTS.

Application filed November 26, 1920. Serial No. 426,426.

*To all whom it may concern:*

Be it known that I, FRANKLIN E. ABBOTT, citizen of the United States, residing at Buffalo, in the county of Erie and State of New York, have invented new and useful Improvements in Splice Bars for Rail Joints, of which the following is a specification.

This invention relates to improvements in splice-bars for the joints of railway rails and more particularly to an improved form of splice-bar peculiarly adapted to facilitate the rigid securing of the joint by means of a connecting weld between the splice-bars and the rails. The bar of my present invention has for its object to provide a splice-bar of improved construction, embodying special provision for obtaining a more efficient welded connection between the bar and the rail, and which will, moreover, materially simplify the operation of welding, and result in a corresponding economy of installation.

As commonly practiced in connection with electric tramways, the splice-bars are rigidly connected to the respective rail ends by a welding process so as to provide a rigid joint between the rails. Customarily the welded connection between the splice-bar and rail is accomplished by means of a welding rod which is suitably held in position along the line of weld desired and subjected to a welding flame, whereby the metal of the rod is fused with that of the rail and bar so as to form a uniting weld. In so welding the joints composed of the standard types of splice-bars, as heretofore employed, considerable difficulty has been encountered in producing the connecting weld between the upper edge of the splice-bars and the under side of the rail head, and in obtaining a proper weld therebetween. The difficulties presented, as will be readily appreciated, occur by reason of the outer face of the splice-bar being substantially in the vertical plane defining the outer side of the rail head, or within such plane, imposing the requirement that the welding rod be manually held or supported in position during the welding operation. As a result thereof, the welding operation at this point has been not only difficult, but the resulting weld is lacking in uniformity and effectiveness. In accordance with my present invention, I have simply and effectively eliminated the objections aforesaid, by a simple change in the form of the splice-bars which is readily produced in the rolling of the bars, and consists in the formation of a small shoulder extension longitudinally of the upper marginal edge of the splice-bar, and of a form adapted to project outwardly from the outer sides of the rail head and provide a supporting shoulder adapted to support the welding rod thereon in proper position for producing the desired connecting weld. Accordingly by the use of my improved design of splice-bar, the weld between the rail head and bar may be simply and quickly accomplished by placing the welding rod upon the supporting shoulder provided therefor, and subjecting same to the welding flame.

The described and other valuable features of my present invention will be understood by reference to the accompanying drawings, wherein like reference numerals are applied to the corresponding parts in the several views.

In the figures, 1 indicates the rails, the meeting ends of which are connected by the rail joint in the usual manner. As here shown, the rail ends are connected by the splice-bars 2 which are arranged in pairs, one on each side of the rails, and held in position by securing bolts fitted to the apertures in the splice-bars and rail in the customary manner. The rail joint, as here illustrated, may also embody a desirable form of base plate 4, positioned beneath the meeting rail ends and bridging the ties in the usual manner.

Figure 1:
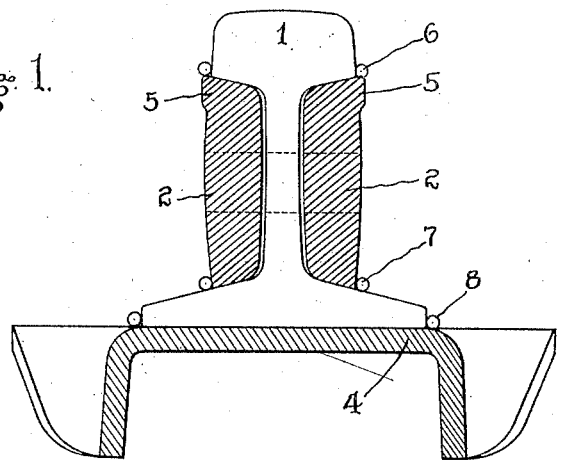
Fig. 1 is a vertical cross sectional view through a rail joint composed of splice-bars embodying the features of my present invention.

As indicated in Fig. 1, the splice-bars 2 may conform largely to standard cross section, and to carry out the purposes and to obtain the advantages of my invention, the upper portion of the bars are modified in form to provide the welding shoulder extension 5 adapted to project slightly beyond the outer side surface of the rail head. These shoulders are of a form to provide support for a welding rod 6 as indicated. In the joint, as illustrated in Fig. 1, welding connections between the rail ends and connecting devices are effected by means of the welding rods 6, 7 and 8, fused with the metal of the rail, bars and plate in the positions as indicated at the upper marginal edge of the splice-bar, at the bottom thereof, and at the junction of the outer surface of the rail flange and upper surface of the base plate respectively.

The weld supporting shoulders may desirably be about three sixteenths of an inch in width and in the welding the abrupt shoulder thereof is merged into the substantially flattened weld.

Figure 2:
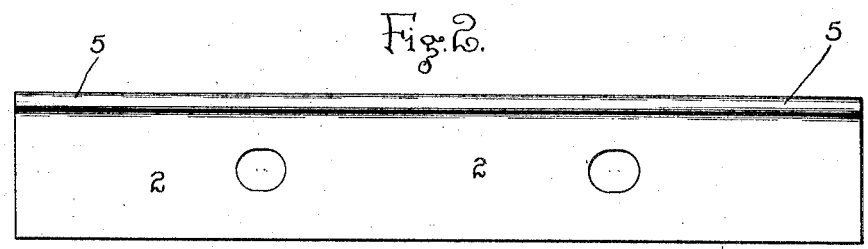
Fig. 2 is a side elevation of one of the splice-bars of which the rail joint of Fig. 1 is composed.

In the approved form of "fish plate" type of splice-bar, illustrated in Figs. 1 and 2, the welding shoulder 5 may desirably be of the size and form illustrated which permits of it being rolled as an integral part of the bar and extends longitudinally of the upper and outer marginal edge thereof. The top surface of the welding shoulder 5 is as shown, inclined as a continuation of the top surface or fishing angle of the bar.

The shoulder 5 is of sufficient size to provide support for the welding rod 6, which is laid thereon preparatory to being welded or fused with the metal of the rail head and splice-bar shoulder. Thus by simple modification in the rolling of the bar special provision is made to facilitate the welding operation in a manner contributing to the efficiency of the weld, and effecting substantial economy in the installation. In the approved form illustrated in Fig. 1, the form of the splice-bar permits of it being reversed in position if it is desired to produce an unwelded joint. When so reversed the splice-bars will be of standard non-projecting relation, with relation to the under side of the rail head.

Figure 3:
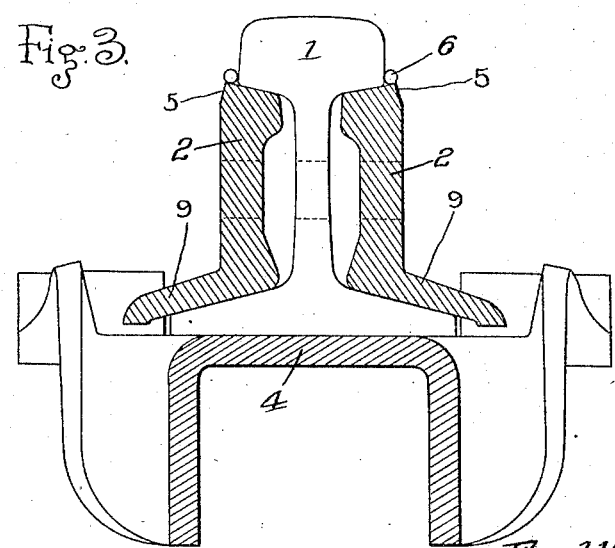
Fig. 3 is a vertical cross sectional view of a rail joint comprising splice-bars of a different type embodying the features of my invention.

While I have shown and described an approved embodiment of the features of my invention, it will be understood that the same is subject to various modifications without departing from the spirit and scope of the invention. For instance I have shown in Fig. 3 my improved feature of the weld supporting shoulder 5 incorporated in a standard form of splice-bar of the angle bar type, wherein the splice-bar 2 is provided at its lower portion with an outwardly extending flange 9, bearing upon the base flange of the rail.

Having described my invention, I claim:

1. A splice-bar for rail joints of standard section formed with a shoulder extension projecting slightly beyond the lower edge of the rail head to provide support for a welding rod, said shoulder being of a size to provide normal clearance for the wheel flange.

2. The combination in a welded rail joint of the two rails having their ends arranged adjacent and splice-bars engaging the rails on the opposite sides of the web thereof, said splice bars being of standard rolled section and being provided with shoulder extensions upon the upper, outer marginal edges thereof, projecting slightly beyond the lower edges of the rail head and having the top surfaces of the shoulder extensions formed in continuation of the fishing angle at the under side of the rail head to provide support for a welding rod, and said shoulder extensions being of a size allowing clearance for the wheel flange.

3. A reversible fish plate type of splice-bar for rail joints of a standard section provided along one of its outer marginal edges with a small shoulder extension of a form adapted to project beyond the lower outer edge of the rail head to provide support for a welding rod, substantially as described.

4. A reversible fish plate type of splice-bar for rail joints of substantially standard section and provided along one of its outer marginal edges with a small longitudinally continuous shoulder extension of a form adapted to project beyond the lower outer edge of the rail head to provide support for a welding rod and of a size allowing for clearance of the wheel flange.

5. The combination in a welded rail joint of the two rails having their ends arranged adjacent and splice-bars engaging the rails on the opposite sides of the web thereof, said splice-bars being of standard sections modified to provide rolled longitudinally continuous shoulder extensions upon the upper, outer marginal edges thereof, projecting slightly beyond the lower edges of the rail head and of a size allowing for clearance of the wheel flange and having the top surfaces of the shoulder extensions formed in continuation of the fishing angle at the under side of the rail head to provide support for a welding rod, substantially as described.

In testimony whereof I have signed my name to this specification.

FRANKLIN E. ABBOTT.